(12) United States Patent
Xu et al.

(10) Patent No.: US 11,757,147 B2
(45) Date of Patent: Sep. 12, 2023

(54) SYSTEM AND METHOD FOR RESONANT HEATING BATTERY

(71) Applicant: FORD GLOBAL TECHNOLOGIES, LLC, Dearborn, MI (US)

(72) Inventors: Yang Xu, Canton, MI (US); Jiyao Wang, Canton, MI (US); Silong Li, Canton, MI (US); Joseph Sherman Kimmel, Carleton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 17/146,802

(22) Filed: Jan. 12, 2021

(65) Prior Publication Data
US 2022/0223937 A1 Jul. 14, 2022

(51) Int. Cl.
| | |
|---|---|
| *H01M 10/637* | (2014.01) |
| *H02P 27/12* | (2006.01) |
| *H02P 21/22* | (2016.01) |
| *H01M 10/615* | (2014.01) |
| *H01M 10/625* | (2014.01) |
| *H01M 8/04007* | (2016.01) |
| *H01M 8/04858* | (2016.01) |
| *B60L 58/27* | (2019.01) |
| *B60L 50/60* | (2019.01) |
| *B60L 50/70* | (2019.01) |

(Continued)

(52) U.S. Cl.
CPC .......... *H01M 10/637* (2015.04); *B60L 50/60* (2019.02); *B60L 50/70* (2019.02); *B60L 58/27* (2019.02); *B60L 58/34* (2019.02); *H01M 8/04037* (2013.01); *H01M 8/04701* (2013.01); *H01M 8/04902* (2013.01); *H01M 10/615* (2015.04); *H01M 10/625* (2015.04); *H02P 21/22* (2016.02); *H02P 27/12* (2013.01); *H01M 2220/20* (2013.01); *H01M 2250/20* (2013.01)

(58) Field of Classification Search
CPC .. B60L 15/025; B60L 2240/545; B60L 50/60; B60L 50/70; B60L 58/27; B60L 58/34; H01M 10/486; H01M 10/615; H01M 10/625; H01M 10/63; H01M 10/637; H01M 2220/20; H01M 2250/20; H01M 8/04037; H01M 8/04701; H01M 8/04902; H02P 21/22; H02P 27/12; H02P 29/62
See application file for complete search history.

(56) References Cited

U.S. PATENT DOCUMENTS 9,327,611 B2 * 5/2016 Nishi ................. H01M 10/657

FOREIGN PATENT DOCUMENTS

| CN | 108306078 A | 7/2018 | |
|---|---|---|---|
| CN | 110544808 A | 12/2019 | |
| CN | 112133987 A | * 12/2020 | .......... H01M 10/615 |

OTHER PUBLICATIONS

Machine Translation CN112133987A (Year: 2020).*

* cited by examiner

*Primary Examiner* — Victoria H Lynch
(74) *Attorney, Agent, or Firm* — David B Kelley; Brooks Kushman P.C.

(57) ABSTRACT

A vehicle includes an electric machine, a battery, an inverter, and a controller. The controller switches the inverter at a switching frequency selected to generate an AC current to heat the battery, adjusts a d-axis current of the electric machine to increase a battery heating power, and adjusts a q-axis current of the electric machine according to the adjusted d-axis current.

18 Claims, 8 Drawing Sheets

(51) Int. Cl.
*B60L 58/34* (2019.01)
*H01M 8/04701* (2016.01)

SYSTEM AND METHOD FOR RESONANT HEATING BATTERY

TECHNICAL FIELD

The present disclosure generally relates to a battery or fuel cell for an electric vehicle. More specifically, the present disclosure relates to a system and method for heating a battery or fuel cell for an electric vehicle.

BACKGROUND

Electric vehicles (EVs) include battery electric vehicles (BEVs) and fuel cell electric vehicles (FCEVs). In general, the energy storage system (ESS) of EVs is designed to provide optimized performance at a nominal temperature range such as between 20° C. and 90° C. In the winter, ambient temperatures may be significantly lower than the nominal temperature range, in which case the battery or fuel cells may perform differently.

SUMMARY

A vehicle includes an electric machine, a battery, an inverter coupled between the electric machine and battery, and a controller. The controller switches the inverter at a switching frequency selected to generate an AC current to heat the battery, adjusts a d-axis current of the electric machine to increase a battery heating power without changing the switching frequency selected to generate the AC current to heat the battery, and adjusts a q-axis current of the electric machine according to the adjusted d-axis current.

A method includes, responsive to a traction battery temperature being less than a threshold, switching an inverter operatively arranged with the traction battery at a frequency selected to generate heating power for the traction battery, and responsive to the heating power being less than a required heating power, adjusting a d-axis current of an electric machine operatively arranged with the inverter to increase the heating power towards the required heating power, and adjusting a q-axis current according to the adjusted d-axis current.

A power system includes a fuel cell, an inverter operatively arranged with the fuel cell, and a controller. The controller switches the inverter at a switching frequency selected to generate heating power for the fuel cell, adjusts a d-axis current to increase the heating power, and adjusts a q-axis current according to the adjusted d-axis current.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for heating a battery or fuel cell for an electric vehicle.

Figure 1:
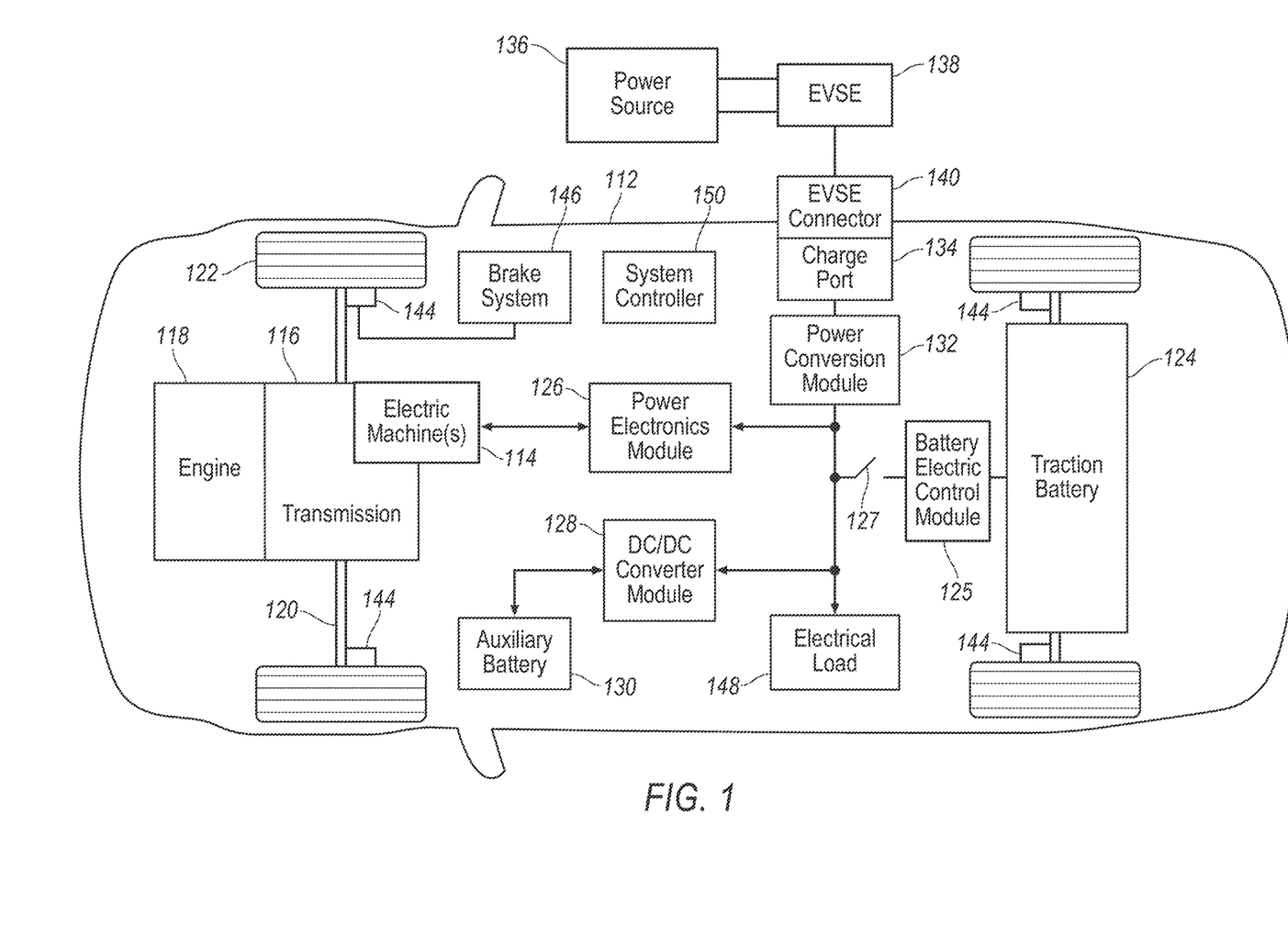
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 14 may provide propulsion and deceleration capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 18 off under certain conditions.

A traction battery or battery pack 124 stores energy that may be used by the electric machines 114. A vehicle battery pack 124 may provide a high voltage DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, the traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery). Other high-voltage loads 146, such as compressors and electric heaters, may be coupled to the high-voltage output of the traction battery 124.

The vehicle 112 may be battery electric vehicle (BEV) or a plug-in hybrid electric vehicle (PHEV) in which the traction battery 124 may be recharged by an external power source 136. Alternatively, the vehicle 112 may be fuel cell electric vehicle (FCEV) propelled by energy stored and/or converted in one or more fuel cells. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 146. The brake system 146 may include other components to operate the wheel brakes 144. For simplicity, the figure depicts a single connection between the brake system 146 and one of the wheel brakes 144. A connection between the brake system 146 and the other wheel brakes 144 is implied. The brake system 146 may include a controller to monitor and coordinate the brake system 146. The brake system 146 may monitor the brake components and control the wheel brakes 144 for vehicle deceleration. The brake system 146 may respond to driver commands and may also operate autonomously to implement features such as stability control. The controller of the brake system 146 may implement a method of applying a requested brake force when requested by another controller or sub-function.

One or more electrical loads 148 may be coupled to the high-voltage bus. The electrical loads 148 may have an associated controller that operates and controls the electrical loads 148 when appropriate. Examples of electrical loads 148 may be a heating module, an air-conditioning module or the like.

The various components discussed may have one or more associated controllers to control and monitor the operation of the components. The controllers may communicate via a serial bus (e.g., Controller Area Network (CAN)) or via discrete conductors. A vehicle system controller (VSC) 150 may be present to coordinate the operation of the various components.

Figure 2:
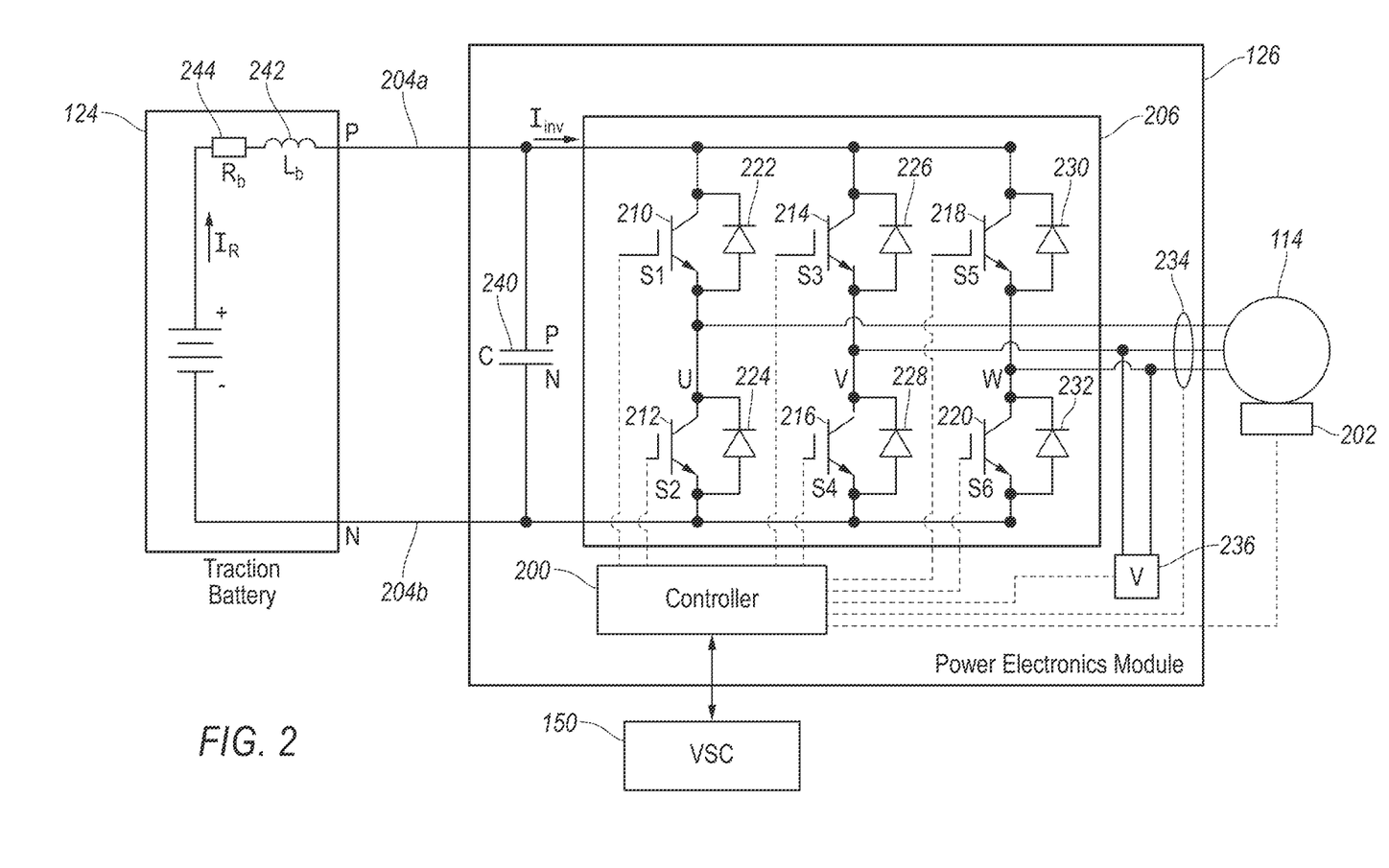
FIG. 2 illustrates an example block diagram of a portion of an electric drive system for a vehicle.

The electric machines 114 may be coupled to the power electronics module 126 via one or more conductors that are associated with each of the phase windings. FIG. 2 depicts a block diagram of a portion of an electric drive system for a vehicle. The vehicle 112 may include one or more power electronics controllers 200 configured to monitor and control the components of the power electronics module 126. The power electronics controllers 200 may be under a global control or coordination of the VSC 150.

The conductors may be part of a wiring harness between the electric machine 114 and the power electronics module 126. A three-phase electric machine 114 may have three conductors coupled to the power electronics module 126. The power electronics module 126 may be configured to switch positive and negative terminals of the high-voltage (HV) bus (HV rail) 204 to phase terminals of the electric machines 114. The power electronics module 126 may be controlled to provide a pulse-width modulated (PWM) voltage and sinusoidal current signals to the electric machine 114. The duty ratio of the signals may be proportional to the rotational speed of the electric machine 114. The controller 200 may be configured to adjust the voltage and current output of the power electronics module 126 at one or more predetermined switching frequencies. The switching frequency may be the rate at which the states of switching devices within the power electronics module 126 are changed.

The power electronics module 126 may interface with a position/speed feedback device 202 that is coupled to the rotor of the electric machine 114. For example, the position/speed feedback device 202 may be a resolver or an encoder. The position/speed feedback device 202 may provide signals indicative of a position and/or speed of the rotor of the electric machine 114. The power electronics 126 may include the power electronics controller 200 that interfaces to the speed feedback device 202 and processes signals from the speed feedback device 202. The power electronics controller 200 may be programmed to utilize the speed and position feedback to control the power electronics module 126 to operate the electric machine 114.

The traction inverter or power electronics module 126 may include power switching circuitry 206 that includes a plurality of switching devices 210, 212, 214, 216, 218, 220. The switching devices 210, 212, 214, 216, 218, 220 may be Insulated Gate Bipolar Transistors (IGBT), Metal Oxide Semiconductor Field Effect Transistors (MOSFET), or other solid-state switching devices. The switching devices 210, 212, 214, 216, 218, 220 may be configured to selectively couple a positive terminal and a negative terminal of the high-voltage bus 204 to each phase terminal or leg (e.g., labeled U, V, W) of the electric machine 114. The power electronics 126 may be configured to provide a U-phase voltage, a V-phase voltage and a W-phase voltage to the electric machine 114. Each of the switching devices 210, 212, 214, 216, 218, 220 within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A phase leg of the power electronics module 126 may include switching devices and circuitry configured to selectively connect a phase terminal of the electric machine 114 to each terminal of the high-voltage bus 204. A first switching device S1 210 may selectively couple the HV bus positive terminal 204a to a first phase terminal (e.g., U) of the electric machine 114. A first diode 222 may be coupled in parallel to the first switching device S1 210. A second switching device S2 212 may selectively couple the HV bus negative terminal 204b to the first phase terminal (e.g., U) of the electric machine 114. A second diode 224 may be coupled in parallel to the second switching device S2 212. A first inverter phase leg may include the first switching device S1 210, the first diode 222, the second switching device S2 212, and the second diode 224.

A third switching device S3 214 may selectively couple the HV bus positive terminal 204a to a second phase terminal (e.g., V) of the electric machine 114. A third diode 226 may be coupled in parallel to the third switching device S3 214. A fourth switching device S4 216 may selectively couple the HV bus negative terminal 204b to the second phase terminal (e.g., V) of the electric machine 114. A fourth diode 228 may be coupled in parallel to the fourth switching device S4 216. A second inverter phase leg may include the third switching device S3 214, the third diode 226, the fourth switching device S4 216, and the fourth diode 228.

A fifth switching device S5 218 may selectively couple the HV bus positive terminal 204a to a third phase terminal (e.g., W) of the electric machine 114. A fifth diode 230 may be coupled in parallel to the fifth switching device S5 218. A sixth switching device S6 220 may selectively couple the HV bus negative terminal 204b to the third phase terminal (e.g., W) of the electric machine 114. A sixth diode 232 may be coupled in parallel to the sixth switching device S6 220. A third inverter phase leg may include the fifth switching device S5 218, the fifth diode 230, the sixth switching device S6 220, and the sixth diode 232.

The power switching devices 210, 212, 214, 216, 218, 220 may include two terminals that handle the high-power current through the power switching device. For example, an IGBT includes a collector (C) terminal and an emitter (E) terminal and a MOSFET includes a drain terminal (D) and a source (S) terminal. The power switching devices 210, 212, 214, 216, 218, 220 may further include one or more control inputs. For example, the power switching devices 210, 212, 214, 216, 218, 220 may include a gate terminal (G) and a Kelvin source/emitter (K) terminal. The G and K terminals may comprise a gate loop to control the power switching device.

The power electronics module 126 may be configured to flow a rated current and have an associated power rating. Some applications may demand higher power and/or current ratings for proper operation of the electric machine 114. The power switching circuitry 206 may be designed to include power switching devices 210, 212, 214, 216, 218, 220 that can handle the desired power/current rating. The desired power/current rating may also be achieved by using power switching devices that are electrically coupled in parallel. Power switching devices may be electrically coupled in parallel and controlled with a common control signal so that each power switching device flows a portion of the total current flowing to/from the load.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the HV bus positive terminal 204a or the HV bus negative terminal 204 at a particular time.

Various motor control algorithms and strategies are available to be implemented in the power electronics controller 200. The power electronics module 126 may also include current sensors 234. The current sensors 234 may be inductive or Hall-effect devices configured to generate a signal indicative of the current passing through the associated circuit. In some configurations, two current sensors 234 may be utilized and the third phase current may be calculated from the two measured currents. The controller 200 may sample the current sensors 234 at a predetermined sampling rate. Measured values of the phase currents of the electric machine 114 may be stored in controller memory for later computations.

The power electronics module 126 may include one or more voltage sensors. The voltage sensors may be configured to measure an input voltage to the power electronics module 126 and/or one or more of the output voltages of the power electronics module 126. The power electronics module 126 may include a line voltage sensor 236 that is configured to measure a line voltage across the V and W phase outputs. The voltage may be a voltage difference between the V-phase voltage and the W-phase voltage. The voltage sensors may be resistive networks and include isolation elements to separate high-voltage levels from the low-voltage system. In addition, the power electronics module 126 may include associated circuitry for scaling and filtering the signals from the current sensors 234 and the voltage sensors. In some configurations, each phase leg of the inverter may have corresponding voltage and current sensors.

Under normal/discharge operating conditions, the power electronics controller 200 controls operation of the electric machine 114. For example, in response to torque and/or speed setpoints, the power electronics controller 200 may operate the switching devices 210, 212, 214, 216, 218, 220 to control the torque and speed of the electric machine 114 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with PWM signals to control the torque and speed of the electric machine 114. The power electronics controller 200 may implement various well-known control strategies to control the electric machine 114 using the switching devices such as vector control and/or six-step control. During discharge operating conditions, the switching devices 210, 212, 214, 216, 218, 220 are actively controlled to achieve a desired current through each phase of the electric machine 114.

Under regenerative/charge operating conditions (e.g. regenerative mode), the power electronics controller 200 may control the power electronics module 126 to accommodate power generated by the electric machine 114. For example, the power electronics controller 200 may operate the switching devices 210, 212, 214, 216, 218, 220 to convert AC power generated by the electric machine 114 to DC current to charge the traction battery 124 via the high-voltage rail 152. The power electronics controller 200 may implement various well-known control strategies to perform the regenerative operation.

The power electronics module 126 may also include one or more bus capacitors 240 that are coupled across the positive and negative terminals of the HV bus 204. The bus capacitors 260 may smooth the voltage of the positive terminal 204a as well as the voltage of the negative terminal 204b of the HV bus. As illustrated in FIG. 2, the bus capacitor 240 may be integrated with the power electronics module 126. Alternatively, the bus capacitor 240 may be independent components outside the power electronics module 126. The traction battery 124 may include a stray/parasitic inductance $L_b$ 242 caused by various electronic components of the traction battery 124. Alternatively, an extra inductor may be used to add inductance $L_b$ to the battery circuit depending on design needs. With the inductance 242 and the capacitor 240, an LC resonant circuit may be achieved with appropriate switching frequency on the switching devices 210, 212, 214, 216, 218, 220. The resonant frequency of the circuit may be calculated by the following equation:

$$f_{resonant} = \frac{1}{2\pi\sqrt{L_b C}} \quad (1)$$

When the LC resonant current flows through an internal resistance 244 of the traction battery 124, heat may be generated to warm the battery cells. The internal resistance 244 may be inherently formed by various components such as wires and cells within the traction battery 124. Alternatively, one or more resistors having a predefined value may be added to the traction battery 124 to provide a desired heating effect depending the specific design need. Since the switching frequency may be actively controlled by the power electronics controller 200, the current on the inverter side $I_{inv}$ may have a major harmonic component at or near the resonant frequency of the circuit. The heating power may be manipulated by adjusting the switching frequency. The current flowing through the battery resistor $I_R$ may be calculated using the following equation:

$$I_R = I_{inv} * \frac{1/(j*2\pi fC)}{R + j*2\pi fL + 1/(j*2\pi fC)} \quad (2)$$

wherein j represents a unit imaginary number which is equal to $\sqrt{-1}$.

Figure 3:
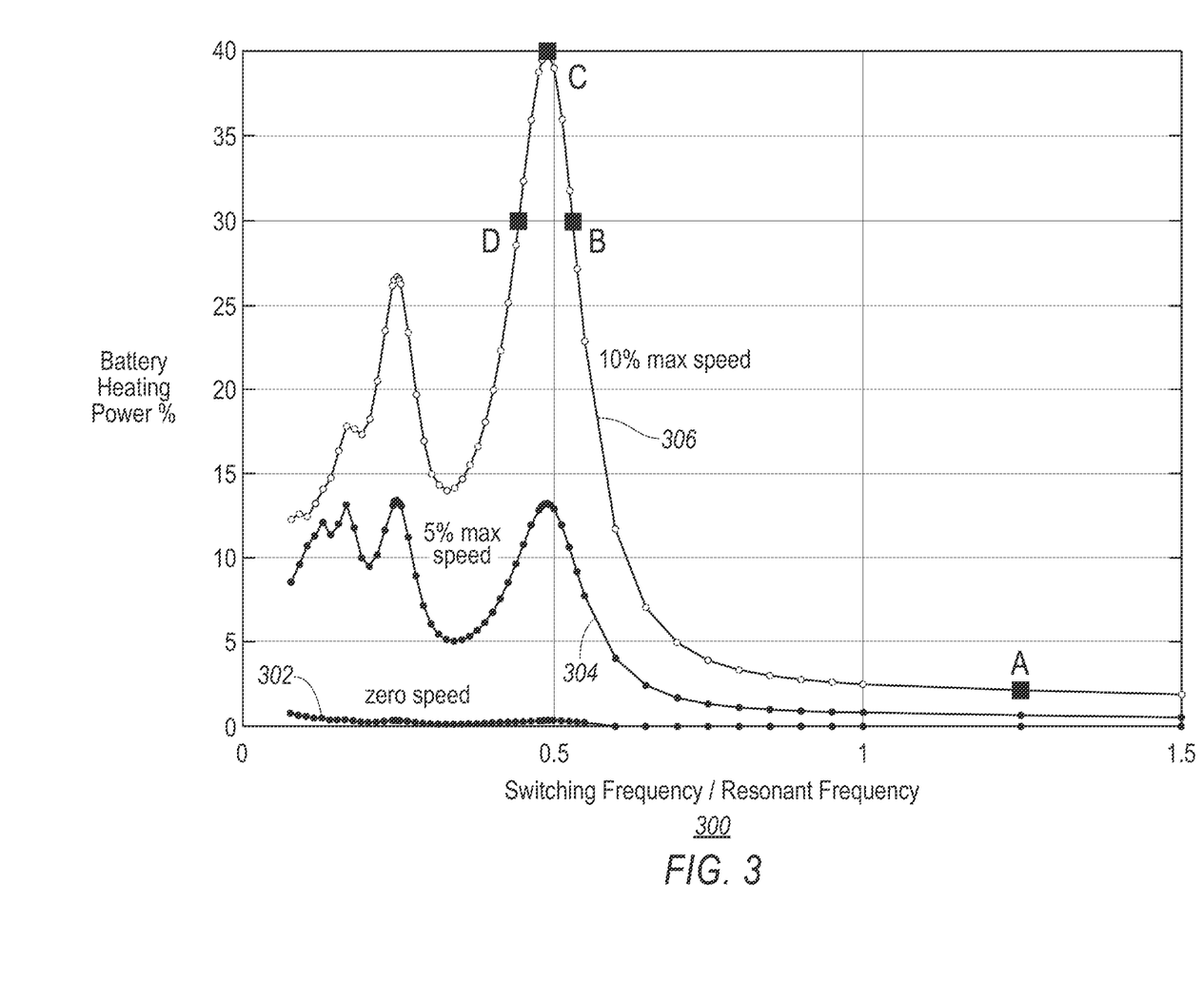
FIG. 3 illustrates an example waveform diagram of battery heating power at various frequencies.

Referring to FIG. 3, an example waveform diagram 300 illustrating battery heating power adjusted by the switching frequency at multiple vehicle speeds is illustrated. With continuing reference to FIGS. 1 and 2, in the present example the battery heating power may be adjustable by varying the switching frequency on the switching devices 210, 212, 214, 216, 218, 220. The horizontal axis of the waveform diagram 300 represents a ratio between the switching frequency and the resonant frequency of the circuit (i.e., $f_{switching}/f_{resonant}$). In the present example, given that the dominant content frequency may occur at the second harmonic of the switching frequency, the present example may purposely operate at a ratio of 0.5 in order to excite dominant content at the resonant frequency. The vertical axis represents a percentage of battery heating power as compared with a reference heating power applied to the battery 124 via an external heater (not shown). For instance, the external heater may have a heating power of 4 kW in the present example for demonstrative purposes although other reference heating power may be used in other examples under substantially the same principle of the present disclosure. The waveform diagram 300 includes 3 waveforms 302, 304, 306, each corresponds to a different vehicle speed. The first waveform 302 illustrates the heating power percentage at substantially zero vehicle speed; the second waveform 304 illustrates the heating power percentage when the vehicle 112 is operating at 5% of the maximum vehicle speed; the third waveform 306 illustrates the heating power percentage when the vehicle 112 is operating at 10% of the maximum vehicle speed. Taking the third waveform 306 at 10% of maximum speed for instance, the battery heating power is the maximum at around 40% (e.g. point C) when the switching frequency is around half of the resonant frequency. The battery heating power reduces significantly when the switching frequency is above resonant heating power (e.g. point A). The battery heating power may be substantially adjustable between 0.25 and 0.75 of the resonant frequency. For instance, the battery heating power may be reduced to 30% by adjusting the switching frequency to 0.45 or 0.55 of the resonant frequency (points B and D). The second waveform 304 at 5% of the maximum speed generally follows the same trend although the specific heating power number is lower due to a lower vehicle speed. Since the duty ratio of the switch signals for the switching devices 210, 212, 214, 216, 218, 220 is substantially zero at zero speed, as illustrated on the waveform 302, the heating power may be limited. The waveforms illustrated in FIG. 3 are merely examples of the present disclosure and the maximum heating power may be achieved at other switching frequencies. For instance, the maximum heating power may be achieved at $k*(f_{resonant}/2)$ frequency, wherein k is an integer equal to or greater than 1.

Figure 4:
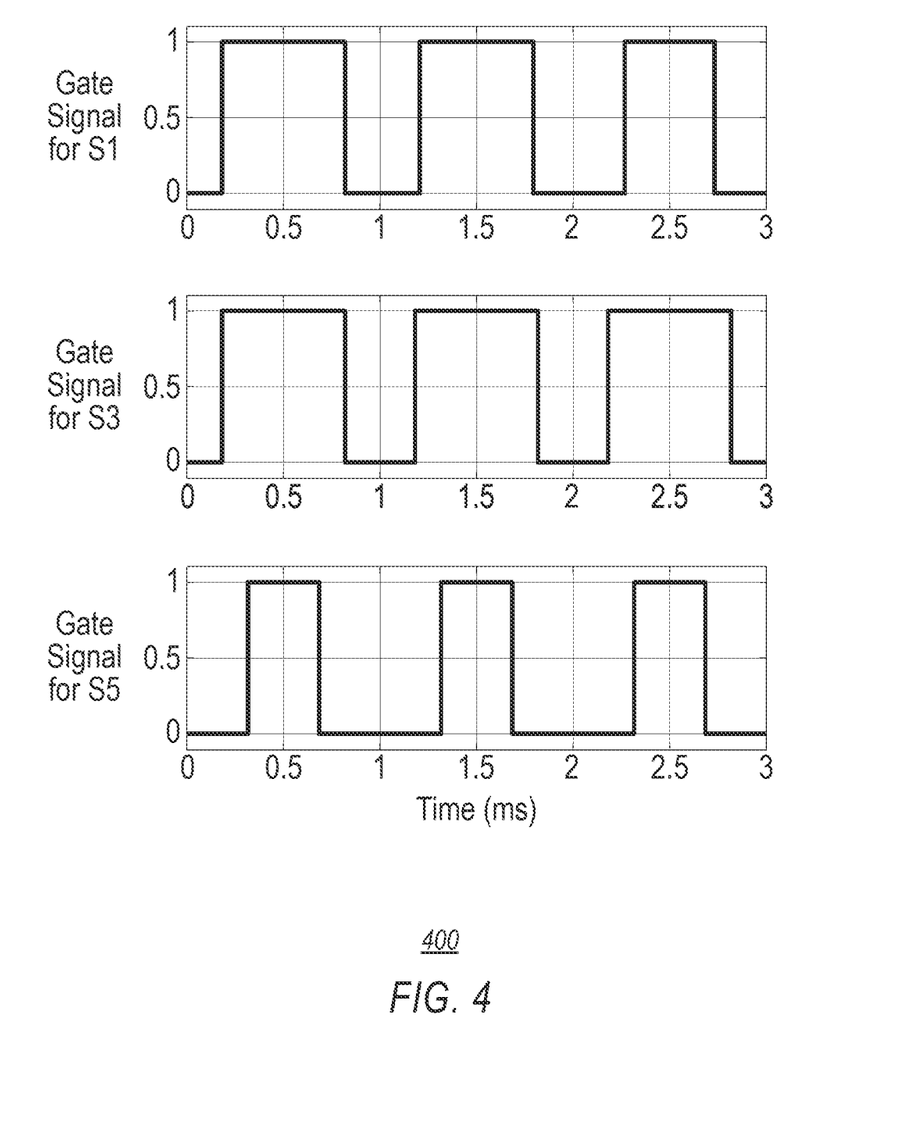
FIG. 4 illustrates example waveform diagrams for switching signals for switching devices.
Figure 5:
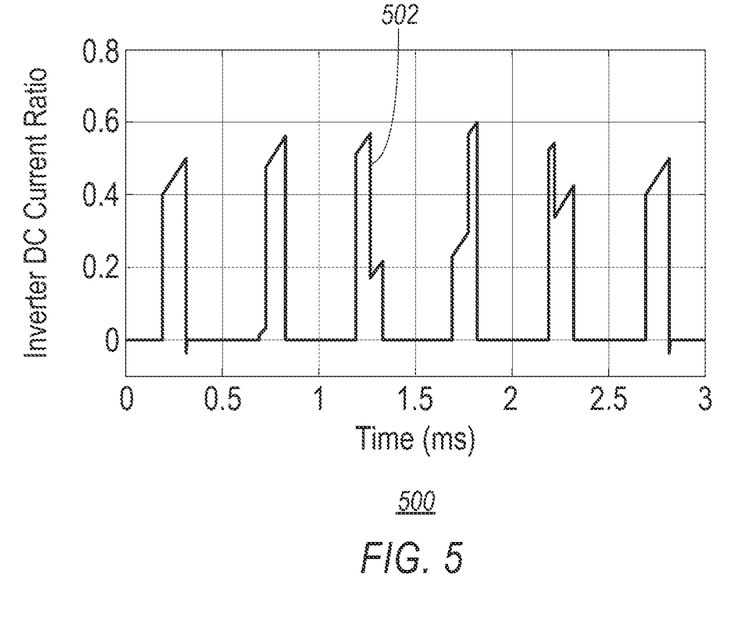
FIG. 5 illustrates an example waveform diagram for an inverter DC side current ratio.
Figure 6:
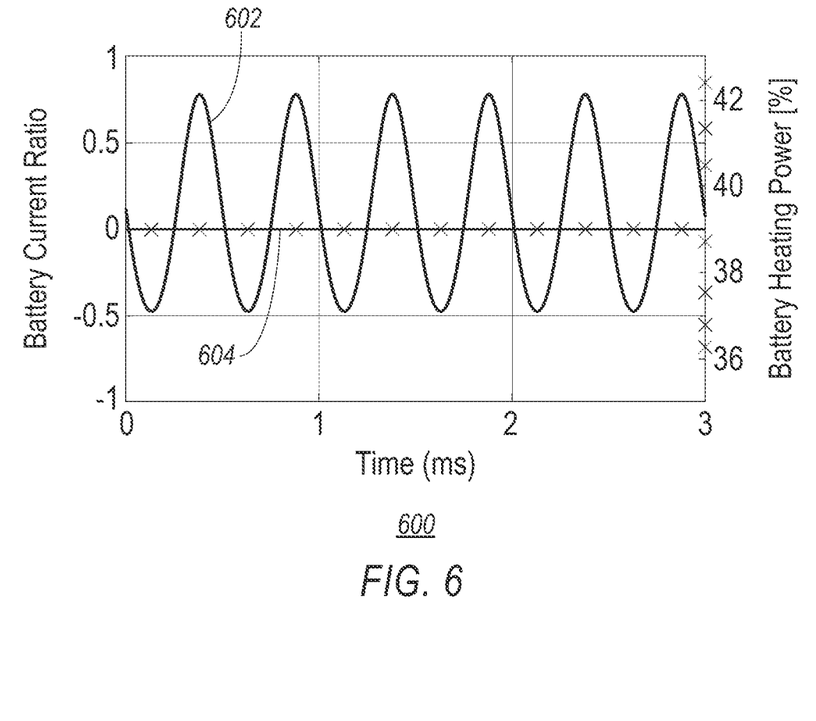
FIG. 6 illustrates an example waveform diagram for a battery current ratio and battery heating power percentage.

Referring to FIG. 4, example waveform diagrams 400 for the switching signals (gate signals) for the switching devices S1 210, S3 214 and S5 218 are illustrated. Although the waveform diagrams 400 only illustrate the switching devices S1 210, S3 214 and S5 218 connecting the phase terminals U, V, W of the power electronics module 126 to the positive HV bus 204a, the corresponding switching devices S2 212, S4 216, S6 220 connecting the phase terminals U, V, W to the negative HV bus 204b are controlled in a complementary manner because only one terminal of the HV bus 204 may be connected at a particular time. In the present example, the switching devices are being switched at around half of the resonant frequency of the circuit. The switching signals illustrated in FIG. 4 may cause a DC current on the power electronics module 126. FIG. 5 illustrates a waveform 500 for a current on the DC side of the power electronics module 126 normalized to a motor-rated reference current. The DC current 502 illustrated in FIG. 5 may cause an AC current 602 illustrated in FIG. 6 in a normalized manner. As the AC current 602 flows through the battery resistor 244 of the battery 124, the heating effect may be achieved. As illustrated in FIG. 6, the battery heating power is presented in waveform 604 normalized to the external reference heater of 4 kW power.

Figure 7:
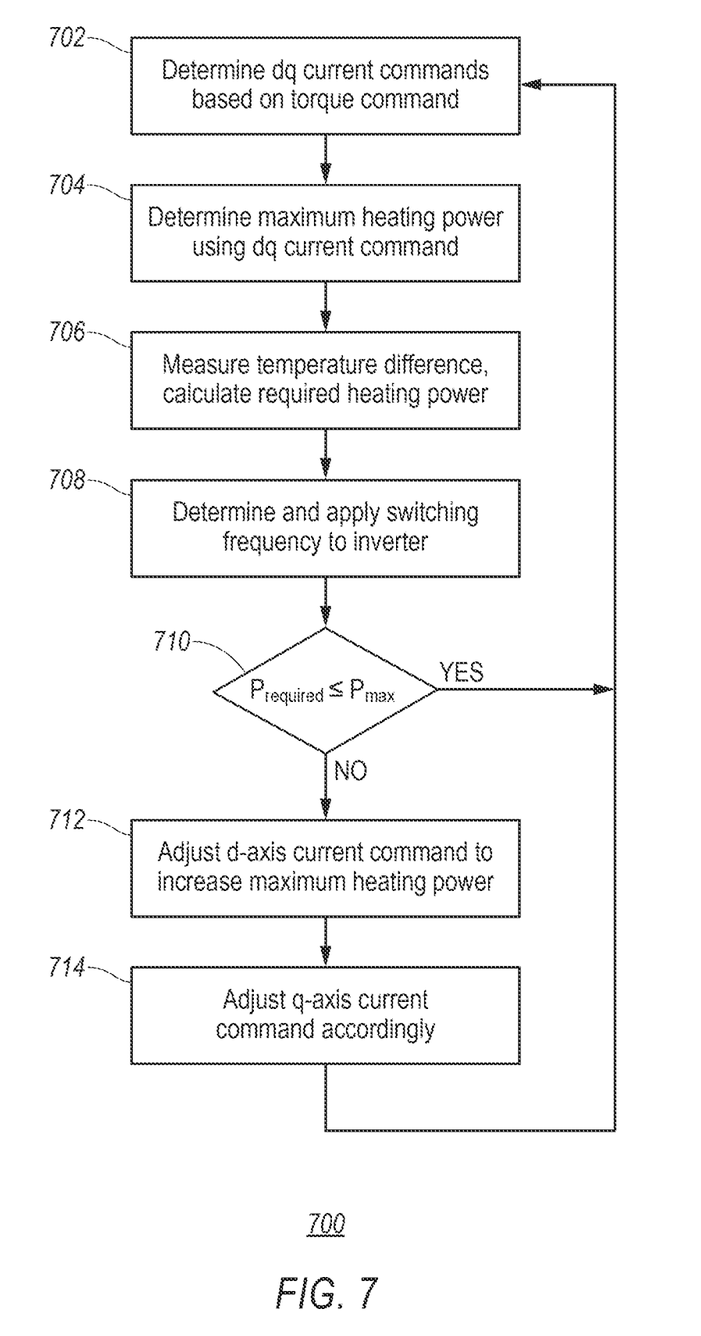
FIG. 7 illustrates an example flow diagram for a battery heating process.

Referring to FIG. 7, a flow diagram for a battery heating process 700 is illustrated. With continuing reference to FIGS. 1-6, at operation 702, responsive to receiving a torque demand T*, the power electronics controller 200 determines a current command $I_d$ on a d-axis and a current command $I_q$ on a q-axis of the electric machine 114. The torque demand T* may be obtained by the power electronics controller 200 responsive to a user input to an accelerator pedal (not shown) of the vehicle. For instance, the torque demand T* may be substantially proportional to a force/depth of depression applied to the accelerator pedal. With the torque demand T* obtained, the power electronics controller 200 may determine the current command $I_d$ and $I_q$ on the d-axis and q-axis using one or more lookup tables. For instance, a one-dimensional lookup table for the torque demand T* and the current command $I_d$ on the d-axis may be used to determine the d current command $I_d$, and another one-dimensional lookup table for the torque demand T* and the current command $I_q$ on the q-axis may be used to determine the q current command $I_q$. Alternatively, current command may further vary by the rotor speed $\omega_{rm}$. Therefore, the d-axis current command may be determined using a two-dimensional lookup table corresponding to the torque command T* and rotor speed $\omega_{rm}$, and the q-axis current command may be determined using another two-dimensional lookup table corresponding to the torque command T* and rotor speed $\omega_{rm}$. At operation 704, the power electronics controller 200 determines the maximum heating power that is available under the dq current command as determined. The maximum heating power may be determined using a lookup table that records a corresponding relationship between the current commands and the maximum heating power. The lookup table may further record other factors such as frequency, torque and speed. For instance, a waveform of the lookup table for a given d-axis current and q-axis current is illustrated in FIG. 3 as described above. The power electronics controller 200 may determine the maximum heating power is point C at half of the switching frequency in this example.

At operation 706, the power electronics controller 200 measures the temperature of the traction battery 124 and compares it to a desired temperature to determine a temperature difference. Based on the temperature difference, the power electronics controller 200 determines the power that is required to heat up the battery. As an example, the required power may be proportional to the temperature difference. In other words, a greater temperature difference (e.g., extremely cold ambient temperature) may result in a higher required power to heat up the battery 124. With the required power determined, at operation 708, the power electronics controller 200 determines the switching frequency for the switching devices 210, 212, 214, 216, 218, 220 as illustrated in FIG. 3 for instance. If the required power does not exceed the maximum available power determined at operation 704, the power electronics controller 200 may clip heating power output by adjusting the switching frequency away from half of the resonant frequency at which the heating power is at the maximum in the present example. Otherwise, if the required power exceeds the maximum available power, the process proceeds from operation 710 to operation 712 and the power electronics controller 200 adjusts the d-axis current command $I_d$ to increase the maximum heating power.

Figure 8A:
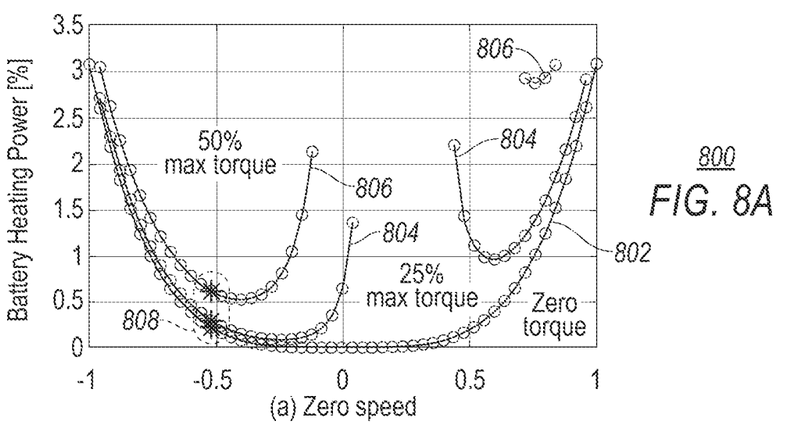
FIGS. 8A, 8B, and 8C illustrate example waveform diagrams of battery heating power varied by d-axis current.
Figure 8B:
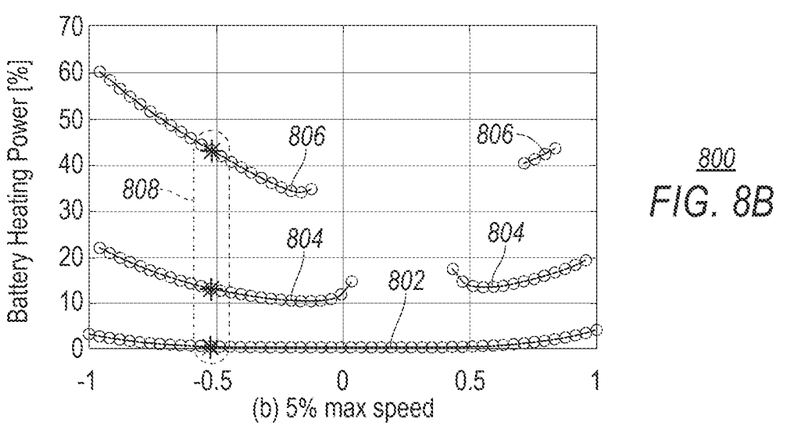
Figure 8C:
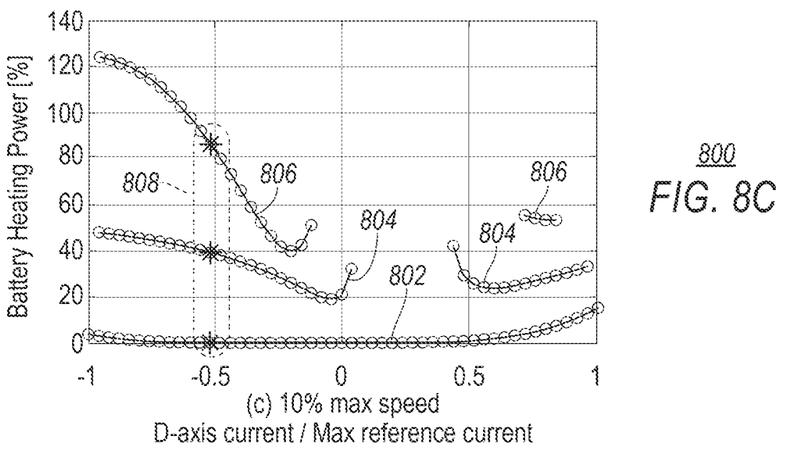

Referring to FIG. 8, example waveform diagrams of battery heating power varied by d-axis current $I_d$ at different speed conditions with a fixed switching frequency of the resonant frequency are illustrated. FIG. 8A illustrates the waveform for zero vehicle speed, FIG. 8B illustrates the waveform for 5% maximum vehicle speed, and the FIG. 8C illustrates the waveform for 10% maximum vehicle speed. The horizontal axis of the waveform diagrams represent a ratio between the d-axis current command $I_d$ and a maximum reference current ($I_d/I_{max}$), and the vertical axis of the diagrams represent a percentage of battery heating power as compared with a reference heating power applied to the battery 124 via an external heater (4 kW for instance). As illustrated in the diagrams, a first waveform 802 illustrates the battery heating power at zero torque from the electric machine 114, a second waveform 804 illustrates the battery heating power at 25% of the maximum torque, and a third waveform 808 illustrates the battery heating power at 50% of the maximum torque. Points 808 represent the original d-axis current command Ia. The maximum heating power represented by the vertical axis of the diagrams may be adjusted by varying the d-axis current command $I_d$ (represented by the horizontal axis). Taking the present figure for example, the original current command $I_d$ is around −0.5 of the maximum reference current. To increase the battery heating power, the power electronics controller 200 may adjust the d-axis current $I_d$ to the left toward the −1 end of the diagram. In other situations, the power electronics controller 200 may adjust the d-axis current $I_d$ to the right toward the +1 end of the diagram to achieve the battery heating power increase.

After adjusting the d-axis current command at operation 712, the power electronics controller 200 adjusts the q-axis current command accordingly at operation 714. The q-axis current command may be calculated using the following equation:

$$I_q^* = \frac{T^*}{\frac{3P}{22}[\lambda_{PM} + (L_d - L_q)I_d^*]} \quad (3)$$

wherein T* represents the desired torque command, P represents the pole pair parameter, $\lambda_{PM}$ represents the permanent magnetic flux, $L_d$ represents the inductance on the d-axis, $L_q$ represents the inductance on the q-axis, and $I^*_d$ represents the d-axis current command as adjusted. Alternatively, the adjusted q-axis current command $I^*_q$ may be determined using a lookup table previously calibrated. In this way, the maximum battery heating power may be manipulated by the switching frequency, the d-axis current command $I_d$ and the q-axis current command $I_q$. The process may return to operation 702 to continue to monitor and adjust the parameters until the desired battery temperature is achieved.

Figure 9:
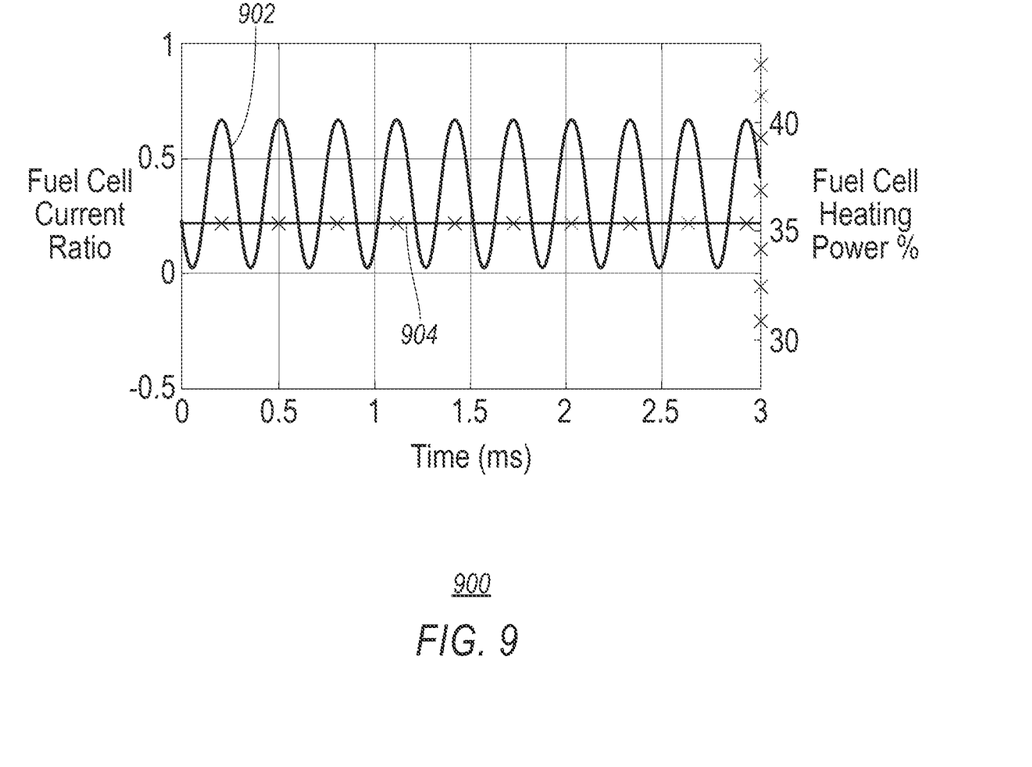
FIG. 9 illustrates an example waveform diagram for a fuel cell current ratio and fuel cell heating power percentage.

The process 700 may be applied to a fuel-cell electric vehicle under substantially the same concept. Referring to FIG. 9, an example waveform diagram of fuel cell current ratio and fuel cell heating power percentage is illustrated. An AC current 902 may flow through one or more resistors of a fuel cell to achieve the heating effect. Since fuel cells cannot operate at negative instantaneous current, no negative current is permitted in the present example. The fuel cell heating power is presented in waveform 904 normalized to the external reference heater of 4 kW power.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an electric machine;
a battery;
an inverter coupled between the electric machine and the battery; and
a controller programmed to switch the inverter at a switching frequency selected to generate an AC current to heat the battery, adjust a d-axis current of the electric machine to increase a battery heating power without changing the switching frequency selected to generate the AC current to heat the battery, and adjust a q-axis current of the electric machine according to the adjusted d-axis current such that the q-axis current is non-zero when the electric machine rotates.

2. The vehicle of claim 1, wherein the d-axis current and the q-axis current are a function of torque demand.

3. The vehicle of claim 1, wherein the q-axis current is proportional to torque demand.

4. The vehicle of claim 1, wherein the controller is further programmed to switch the inverter at the switching frequency selected to generate the AC current to heat the battery responsive to receiving a torque demand and a temperature of the battery being less than a threshold.

5. The vehicle of claim 1, wherein the controller is further programmed to adjust the d-axis current of the electric machine without changing the switching frequency selected to generate the AC current to heat the battery responsive to a heating power resulting from the AC current being less than a heating power requirement.

6. The vehicle of claim 5, wherein the heating power requirement is a function of a target temperature and a temperature of the battery.

7. The vehicle of claim 5, wherein the heating power is a function of a speed of the vehicle.

8. A method comprising:
responsive to a traction battery temperature being less than a threshold, switching an inverter operatively arranged with the traction battery at a switching frequency selected to generate heating power for the traction battery; and
responsive to the heating power being less than a required heating power, adjusting a d-axis current of an electric machine operatively arranged with the inverter to increase the heating power towards the required heating power, and adjusting a q-axis current according to the adjusted d-axis current such that the q-axis current is non-zero when the electric machine rotates.

9. The method of claim 8, wherein the d-axis current is adjusted without changing the switching frequency selected to generate the heating power.

10. The method of claim 8, wherein the d-axis current and the q-axis current are a function of torque demand.

11. The method of claim 8, wherein the q-axis current is proportional to torque demand.

12. The method of claim 8, wherein the required heating power is a function of a target temperature and a temperature of the traction battery.

13. A power system comprising:
a fuel cell;
an inverter operatively arranged with the fuel cell; and
a controller programmed to switch the inverter at a switching frequency selected to generate heating power for the fuel cell, adjust a d-axis current to increase the heating power, and adjust a q-axis current according to the adjusted d-axis current such that the q-axis current is non-zero when an electric machine rotates.

14. The power system of claim 13, wherein the controller is further programmed to adjust the d-axis current without changing the switching frequency selected to generate heating power for the fuel cell.

15. The power system of claim 13, wherein the d-axis current and the q-axis current are a function of torque demand.

16. The power system of claim 13, wherein the q-axis current is proportional to torque demand.

17. The power system of claim 13, wherein the controller is further programmed to switch the inverter at the switching frequency selected to generate heating power for the fuel cell responsive to receiving a torque demand and a temperature of the fuel cell being less than a threshold.

18. The power system of claim 13, wherein the controller is further programmed to adjust the d-axis current responsive to the heating power being less than a heating power requirement.

* * * * *